US009191888B2

(12) United States Patent
Cordeiro

(10) Patent No.: US 9,191,888 B2
(45) Date of Patent: *Nov. 17, 2015

(54) DIRECTIONAL TRANSMISSION TECHNIQUES

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/652,647

(22) Filed: Oct. 16, 2012

(65) Prior Publication Data

US 2013/0039217 A1 Feb. 14, 2013

Related U.S. Application Data

(63) Continuation of application No. 12/315,057, filed on Nov. 25, 2008, now Pat. No. 8,335,170.

(51) Int. Cl.
*H04W 16/28* (2009.01)
*H04W 84/12* (2009.01)
*H04J 3/00* (2006.01)
*H04W 48/20* (2009.01)

(52) U.S. Cl.
CPC .................................. *H04W 48/20* (2013.01)

(58) Field of Classification Search
USPC ............ 370/254, 255; 455/25, 63.4; 342/350, 342/359–368, 385
See application file for complete search history.

(56) References Cited

U.S. PATENT DOCUMENTS

| 6,181,276 | B1 * | 1/2001 | Schlekewey et al. ......... 342/372 |
| 6,400,955 | B1 * | 6/2002 | Kawabata et al. ............ 455/450 |
| 6,771,989 | B1 | 8/2004 | Katz et al. |
| 7,616,617 | B2 * | 11/2009 | Pandey et al. ................. 370/338 |
| 7,889,701 | B2 * | 2/2011 | Malik et al. ................... 370/334 |
| 8,014,781 | B2 * | 9/2011 | Ji et al. .......................... 455/449 |
| 8,027,702 | B2 | 9/2011 | Soffer et al. |
| 8,280,445 | B2 * | 10/2012 | Yong et al. ................. 455/562.1 |

(Continued)

FOREIGN PATENT DOCUMENTS

| JP | H06-260977 A | 9/1994 |
| JP | 2000-510292 A | 8/2000 |

(Continued)

OTHER PUBLICATIONS

Office Action received for U.S. Appl. No. 12/315,057, mailed on Sep. 19, 2011, 8 pages.

(Continued)

*Primary Examiner* — Ahmed Elallam
(74) *Attorney, Agent, or Firm* — Sutherland Asbill & Brennan LLP

(57) ABSTRACT

Embodiments provide techniques for the transmission of broadcasts. For instance, an apparatus may include a sequence selection module, and multiple radiating elements. The sequence selection module selects sequences of directional transmission patterns, where each selected sequence corresponds to a time period. The multiple radiating elements wirelessly transmit a broadcast at the time periods in accordance with the selected sequences. The broadcast may include, for example, beacons, and/or a data broadcast, and/or a control broadcast and/or a management broadcast.

25 Claims, 7 Drawing Sheets

(56) References Cited

U.S. PATENT DOCUMENTS

| | | |
|---|---|---|
| 2007/0191063 A1 | 8/2007 | Iacono et al. |
| 2007/0217369 A1 | 9/2007 | Garrett et al. |
| 2009/0122810 A9 | 5/2009 | Jin et al. |
| 2009/0232109 A1 | 9/2009 | Nandagopalan et al. |
| 2010/0020901 A1 | 1/2010 | Park et al. |
| 2011/0065448 A1 | 3/2011 | Song et al. |

FOREIGN PATENT DOCUMENTS

| | | | |
|---|---|---|---|
| JP | 2003-152610 | A | 5/2003 |
| JP | 2006-333482 | A | 12/2006 |
| JP | 2006-352189 | A | 12/2006 |
| JP | 2007-336547 | A | 12/2007 |
| WO | 97/41705 | A1 | 11/1997 |
| WO | 2008/075264 | A2 | 6/2008 |
| WO | 2008/075264 | A3 | 11/2008 |

OTHER PUBLICATIONS

Office Action received for U.S. Appl. No. 12/315,057, mailed on May 1, 2012, 7 pages.

Notice of Allowance received for U.S. Appl. No. 12/315,057, mailed on Aug. 15, 2012, 12 pages.

Office Action received for Japanese Patent Application No. 2009-266848, mailed on Jul. 12, 2011, 1 page of English Translation and 1 page of Japanese Office Action.

Office Action received for Japanese Patent Application No. 2009-266848, mailed on Mar. 13, 2012, 2 pages of English Translation and 2 pages of Japanese Office Action.

Office Action received for Chinese Patent Application No. 200911000054.3, mailed on Sep. 21, 2012, 7 pages of English Translation, 2 pages of Chinese Search Report and 7 pages of Chinese Office Action.

Office Action received for Chinese Patent Application No. 200911000054.3, mailed on May 22, 2013, 10 pages of English Translation and 7 pages of Chinese Office Action including 2 pages of Search Report.

Office Action received for Japanese Patent Application No. 2012-151331, mailed on Nov. 5, 2013, 4 pages of office action including 2 pages of English translation.

Office Action received for Chinese Patent Application No. 200911000054.3, mailed on Dec. 11, 2013, 14 pages including 8 pages of English Translation.

\* cited by examiner

DIRECTIONAL TRANSMISSION TECHNIQUES

This application claims priority to U.S. application Ser. No. 12/315,057, filed on Nov. 25, 2008.

BACKGROUND

Wireless networks, such as wireless personal area networks (WPANs), wireless local area networks (WLANs), and/or piconets may employ transmissions called beacons. Beacons, which are typically transmitted by central controller nodes, allow client devices to discover, synchronize and associate with a corresponding network.

To reach all client devices, beacons are primarily transmitted in an omni-directional mode. However, some communications systems employ directional wireless transmission techniques. For such systems, multiple directional beacon transmissions in different directions can be made. Through such multiple transmissions, omni-directional (or quasi omni-directional) coverage can be achieved through a sequence of directional transmissions.

In dense environments having several nearby simultaneous operating wireless networks, the sequence in which such multiple directional beacon transmissions are performed may have a significant impact on the network's robustness. For example, certain sequences may result in beacons colliding with transmissions of a nearby network. Thus, the directional transmission sequences employed by a network may affect the ability of devices to discover, synchronize and associate with the network.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for directional transmissions. For instance, an apparatus may include a sequence selection module, and multiple radiating, elements. The sequence selection module selects sequences of directional transmission patterns, where each selected sequence corresponds to a time period. The multiple radiating elements wirelessly transmit a broadcast at the time periods in accordance with the selected sequences. The broadcast may include, for example, beacons and/or a data broadcast.

Through the employment of such sequences, the probability of recurring transmission collisions may be reduced. Thus, embodiments may advantageously improve robustness of wireless networks.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As described above, existing wireless networks provide fir omni-directional broadcast transmissions. Such broadcast transmissions may include beacons, which allow client devices to discover, synchronize, and associate with a network. Also, such broadcast transmissions may include data transmissions. Embodiments, however, are not limited to these exemplary broadcast transmissions.

The techniques described herein may be employed in various types of networks. Examples of such networks include Institute of Electrical and Electronic Engineers (IEEE) 802.15 wireless personal area networks (WPANs), such as Bluetooth networks. Also, these techniques may be employed with IEEE 802.11 wireless local area networks (WLANs). Further exemplary networks include IEEE 802.16 wireless metropolitan area networks (WMANs), such as WiMAX networks. WiMAX networks may support directional transmissions through beamforming capabilities. Also, the techniques described herein may be employed in 60 GHz networks. These networks are provided as examples, and not as limitations. Accordingly, the techniques described herein may be employed with other network types.

In networks having directional communication capabilities, multiple directional transmissions may be employed to provide omni-directional broadcast support. Thus, for a device that supports M directions, a beacon broadcast transmission may be achieved through M transmissions of the beacon frame e.g., one transmission for each supported direction).

Figure 1:
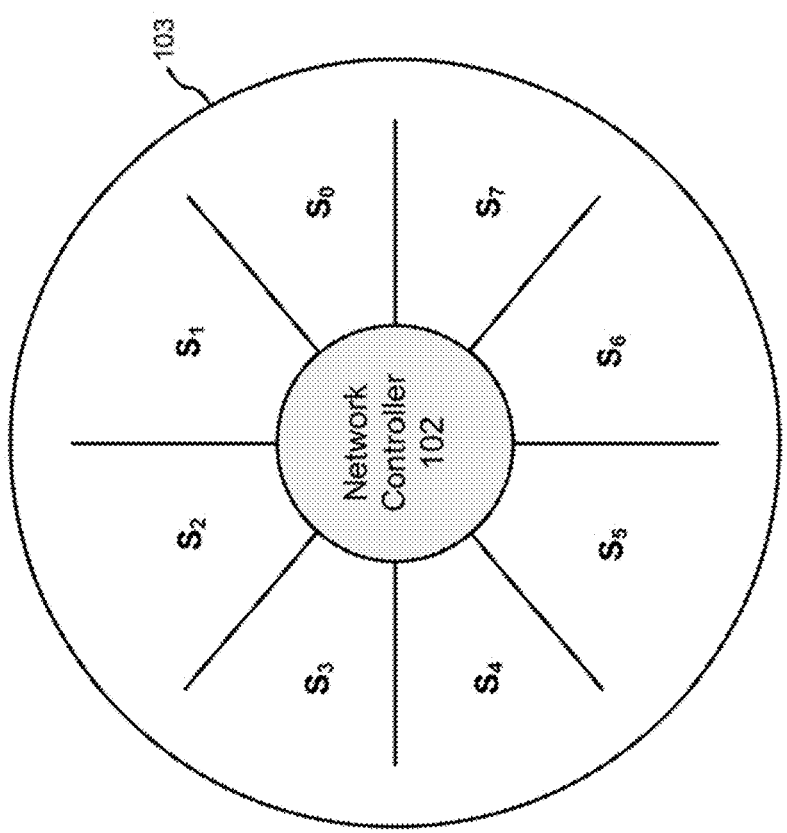
FIG. 1 is a diagram of exemplary transmission sectors.

An example of this feature is provided in FIG. 1, which shows (from a plan perspective) exemplary transmission sectors for a network controller 102. In particular, FIG. 1 shows eight sectors ($S_0$ through $S_7$). These sectors are each within an available transmission panorama 103. For purposes of illustration, available transmission panorama 103 encompasses a full rotation (i.e., 360 degrees) around network controller 102. However, panoramas of other extents may alternatively be employed.

To broadcast a frame, network controller 102 transmits the frame eight times. More particularly, network controller 102 sequentially transmits the frame in each of sectors $S_0$ through $S_7$. As described herein, this technique may be employed with various types of broadcasts, such as beacons, data transmissions, and so forth. Although FIG. 1 shows eight sectors, any number of directional transmission sectors ma be employed. Moreover, embodiments may employ patterns other than sectors.

Wireless networks commonly employ multiple access techniques that allow a number of devices to share communications media. One such technique is carrier sense with multiple access with collision avoidance (CSMA/CA). CSMA/CA allows such sharing through a carrier sensing scheme. More particularly, a device employs carrier sensing before it transmits a frame. The carrier sensing detects whether another signal from a remote device is being transmitted. If so, then the device defers transmitting its frame, and waits for a time interval (also referred to as a "backoff delay") before re-trying to send the frame.

Alternatively or additionally, wireless networks may employ time division multiple access (TDMA) techniques allow such sharing through the allocation of unique time slots to each device.

Figure 2:
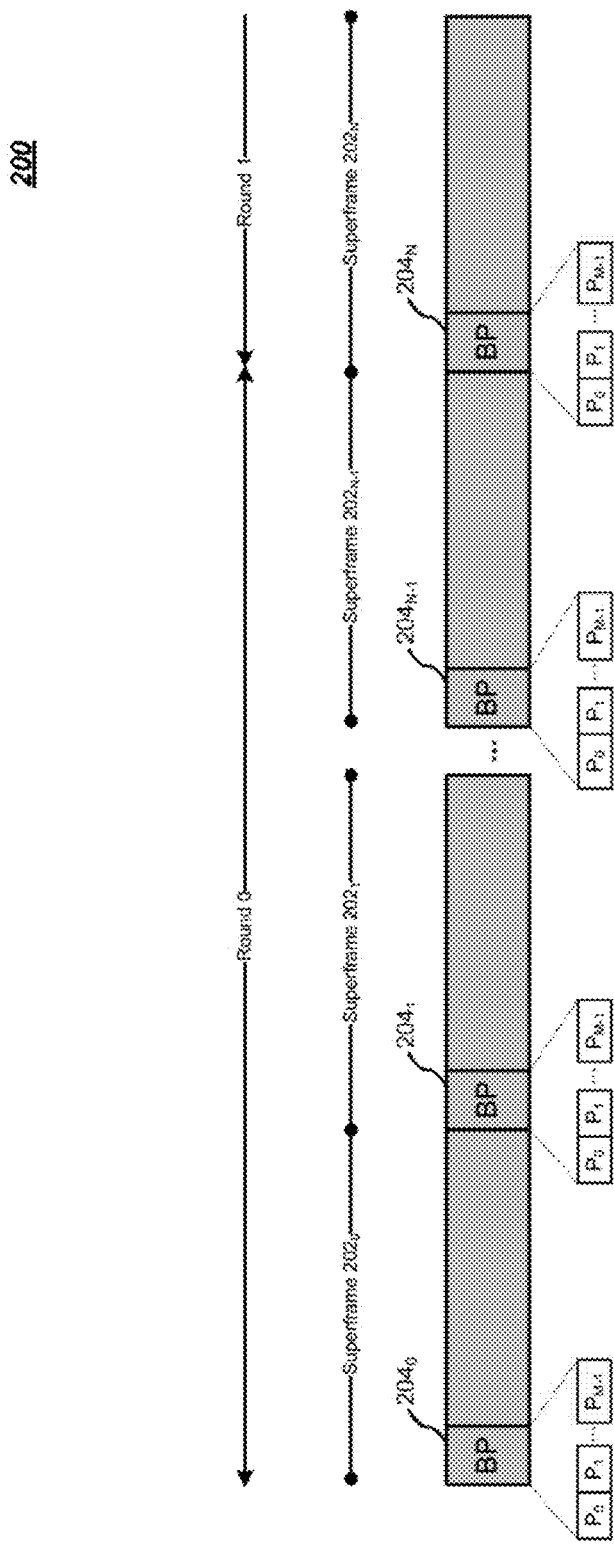
FIG. 2 is a diagram of an exemplary time division multiple access (TDMA) format.

FIG. 2 is a diagram illustrating an exemplary TDMA format 200 for a wireless communications network. This allocation involves a repeating sequence of superframes $202_a$-$202_N$. Each of these superframes includes a beacon period (BP) 204. More particularly, FIG. 2 shows that superframes $202_a$-$202_N$ include BPs $204_a$-$204_N$, respectively.

BPs $204_{a-N}$ provide a network controller node (e.g., a PNC) with resources to transmit beacons. The controller node broadcasts such beacons through multiple (designated by an integer M) directional transmissions. Accordingly, FIG. 2 shows that each of BPs $204_a$-$204_N$ includes multiple portions ($P_0$-$P_{M-1}$). Each directional transmission is sent within a corresponding one of these portions $P_0$-$P_{M-1}$. Thus, when TDMA format 200 is employed in the context of FIG. 1, M=8 because the network controller has eight directional transmission sectors.

Although not shown, data slots within superframes $202_a$-$202_N$ similarly allow a device e.g., a network controller) to broadcast a data transmission. Thus, such data slots may also include M portions for multiple directional data transmissions.

A network controller may employ various directional transmission approaches in the transmissions of broadcasts (e.g., beacons). One approach uses the same directional transmission sequence for successive superframes. Thus, with reference to FIG. 1, directional broadcast frame transmissions for sectors $S_0$ through $S_7$ would occur in the same sequence in successive superframes.

However, various problems may occur when the same directional transmission sequence is employed for successive time periods. For instance, particular directional transmissions within one wireless network may persistently interfere with particular data communications in a nearby wireless network. An example of this problem is described below with reference to FIG. 3.

Figure 3:
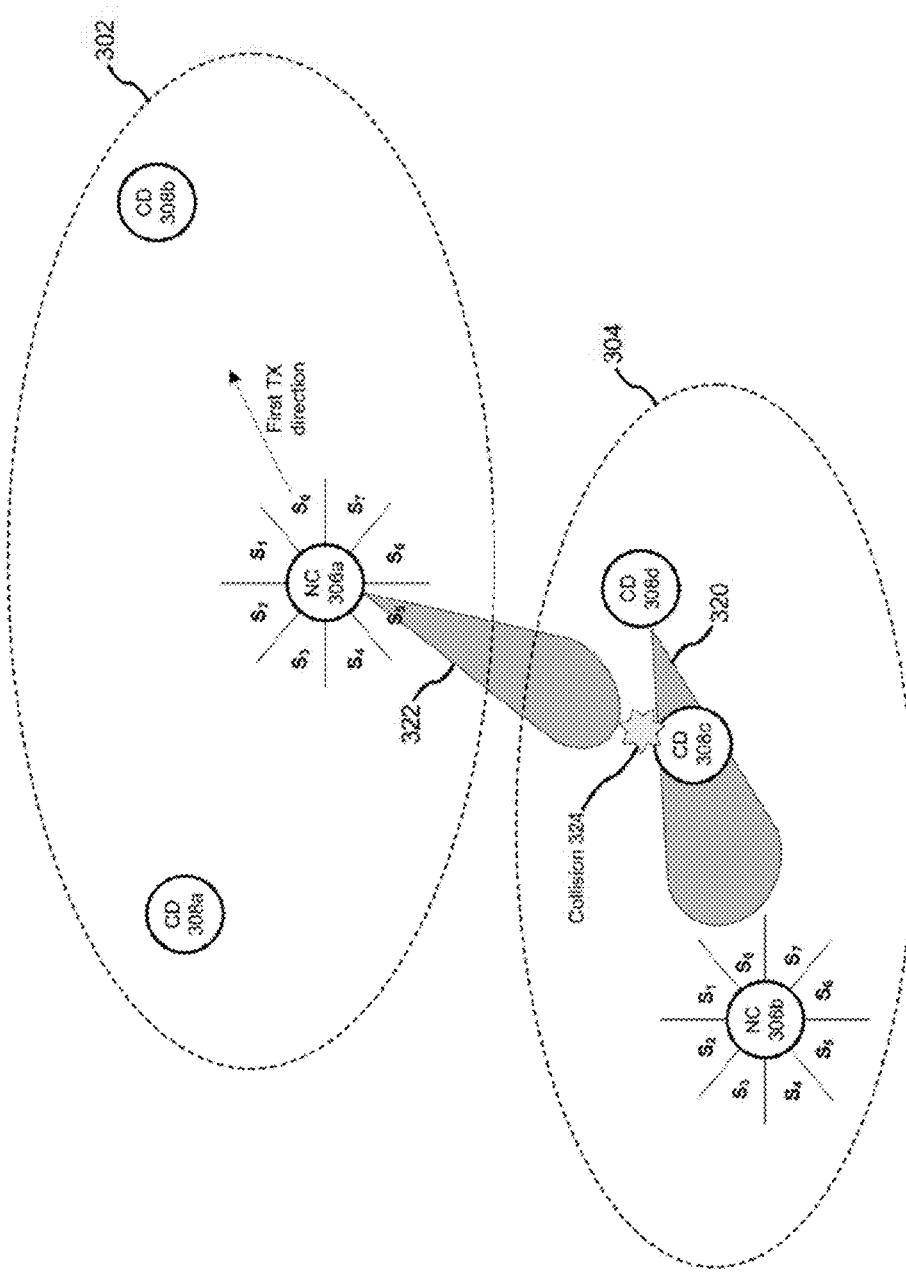
FIG. 3 is a diagram of an exemplary operational environment.

FIG. 3 is a diagram of an exemplary operational environment 300. In this environment, two simultaneously operating wireless networks are in close proximity to each other. More particularly, FIG. 3 shows a first wireless network 302 that is controlled by a network controller 306a, and a second wireless network 304 that is controlled by a network controller 306b. Various client devices (CDs) participate in these networks. For instance, FIG. 3 shows devices 308a and 308b participating in network 302, while devices 308c and 308d participate in network 304.

Each of network controllers 306a and 306b periodically transmit a sequence of beacon transmissions. For instance, at every superframe, network controller 306a transmits a sequence of individual beacons for sectors $S_0$ through $S_7$ (i.e., [$S_0$, $S_1$, $S_2$, $S_3$, $S_4$, $S_5$, $S_6$, $S_7$]).

Also, device 308d is shown sending a data transmission 320 to network controller 306b. During this data transmission, FIG. 3 shows network controller 306a sending a beacon transmission 322 corresponding to sector $S_5$. Although device 308c lies within sector $S_5$ of network controller 306a, it does not receive beacon transmission 322. This is because beacon transmission 322 collides with data transmission 320 (shown in FIG. 3 as a collision 324). Accordingly, this collision impairs or prevents device 308c from discovering, synchronizing, and/or associating with network 302.

If a network controller (such as network controller 306a) always employs the same sequence of beacon transmissions, it is possible that one or more of its beacons (and/or other broadcast(s)) will never be successfully received by certain device(s). This is because such transmissions will collide with a nearby network's scheduled transmissions (e.g., periodic video streaming, another beacon, beamforming training sequences, etc). Such occurrences may unfortunately leave device(s) unable to discover/associate/communicate with the network controller or receive broadcast frames from the network controller for a very long period of time (if at all). Accordingly, the directional sequences used for beacons (or other broadcasts) may impact protocol robustness.

Embodiments provide techniques to avoid such disadvantages. For instance, embodiments may change an employed sequence of directional transmission patterns from one time period (e.g., superframe) to another. As a result, embodiments may enhance the robustness and performance of wireless communications protocols. For example, fewer collisions may occur in simultaneously operating, wireless network environments.

Thus, referring again to FIG. 3, network controller 30a may employ such techniques by using different sequences of directional transmission patterns (e.g., different sequences of sectors $S_0$ through $S_7$) for successive beacons (and/or other broadcasts). By changing such sequences, a network controller (e.g., a PNC) can increase the likelihood that a client device will receive the controller's transmission when another device is not sending an otherwise interfering transmission associated with another network.

Embodiments may employ various techniques to change the sequence in which broadcast frames are transmitted. For example, embodiments may employ random techniques and/or round robin technique(s). However, other techniques may be alternatively or additionally employed.

When employing a random technique, a device (e.g., a network controller) randomly generates a directional transmission sequence before each broadcast (e.g., beacon) is sent. The device then employs this sequence to send the broadcast.

For example, if a total of M (where M is an integer greater than 0) directions are supported, the device generates a sequence C. C is a random permutation of the sequence [$S_0$, $S_1$, ..., $S_{N-1}$]. Thus, by randomly generating C for successive time periods (e.g., for successive superframes), the transmitting device can increase the likelihood that its broadcasts reach a device without collisions from other transmissions.

Figure 4:
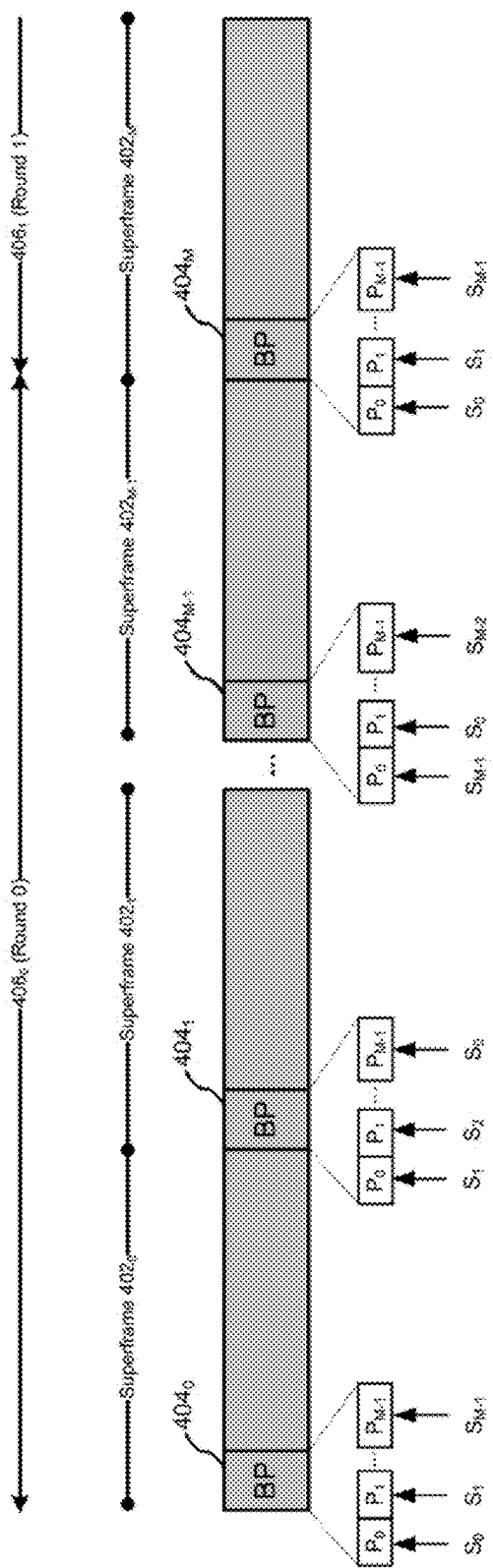
FIG. 4 is a timing diagram.

When employing a round robin technique, a sequence of the M directions supported by a device is rotationally shifted between successive time intervals (e.g., successive superframes). An example of this shifting is shown in FIG. 4, which shows a sequence 400 of superframes $402_0$ through $402_M$. Each of these superframes includes a beacon period (BP). More particularly, FIG. 4 shows superframes $402_0$-$402_M$ having BPs $404_0$-$404_M$, respectively.

As shown in FIG. 4, during BP $404_0$ of superframe $402_0$, the device uses a directional sequence [$S_0$, $S_1$, ... $S_{M-1}$]. In superframe $402_1$, the first direction becomes $S_1$. This results in the directional sequence [$S_1$, $S_2$, ..., $S_0$]. Accordingly, in superframe the sequence becomes [$S_{M-1}$, $S_0$, ..., $S_{M-2}$].

Together, superframes $402_0$ through $402_{M-1}$ constitute a sequence of superframes that is referred to herein as a round. In a given round, each of the M directions be first in a directional sequence. Once this occurs, a next round is started. Accordingly, FIG. 4 shows a round $406_1$ following a round $406_0$.

The directional transmission techniques described herein may be employed for various types of transmissions. The above examples involve beacon transmissions and data broadcasts. However, the disclosed techniques may be employed other types of transmissions. For instance, exemplary transmissions include (but are not limited to) data frames, management frames, and control frames. In embodiments, such frames may be broadcasted. Accordingly, multiple frames (e.g., consecutive frames) may employ different sequences of directional transmission patterns, as described herein.

Data frames carry protocols and data from higher layers within the frame body. Accordingly, data frames may convey payload information associated with one or more applications.

Management frames enable stations to establish and maintain communications. In the context of IEEE 802.11 networks, management frames include authentication frames, deauthentication frames, association request frames, association response frames, reassociation request frames, reassociation response frames, disassociation frames, beacon frames, probe request frames, and probe response frames.

Control frames assist in the delivery of data frames between stations. Exemplary IEEE 802.11 control frames include Request to Send (RTS) frames, Clear to Send (CTS) frames, and Acknowledgement (ACK) frames.

Figure 5:
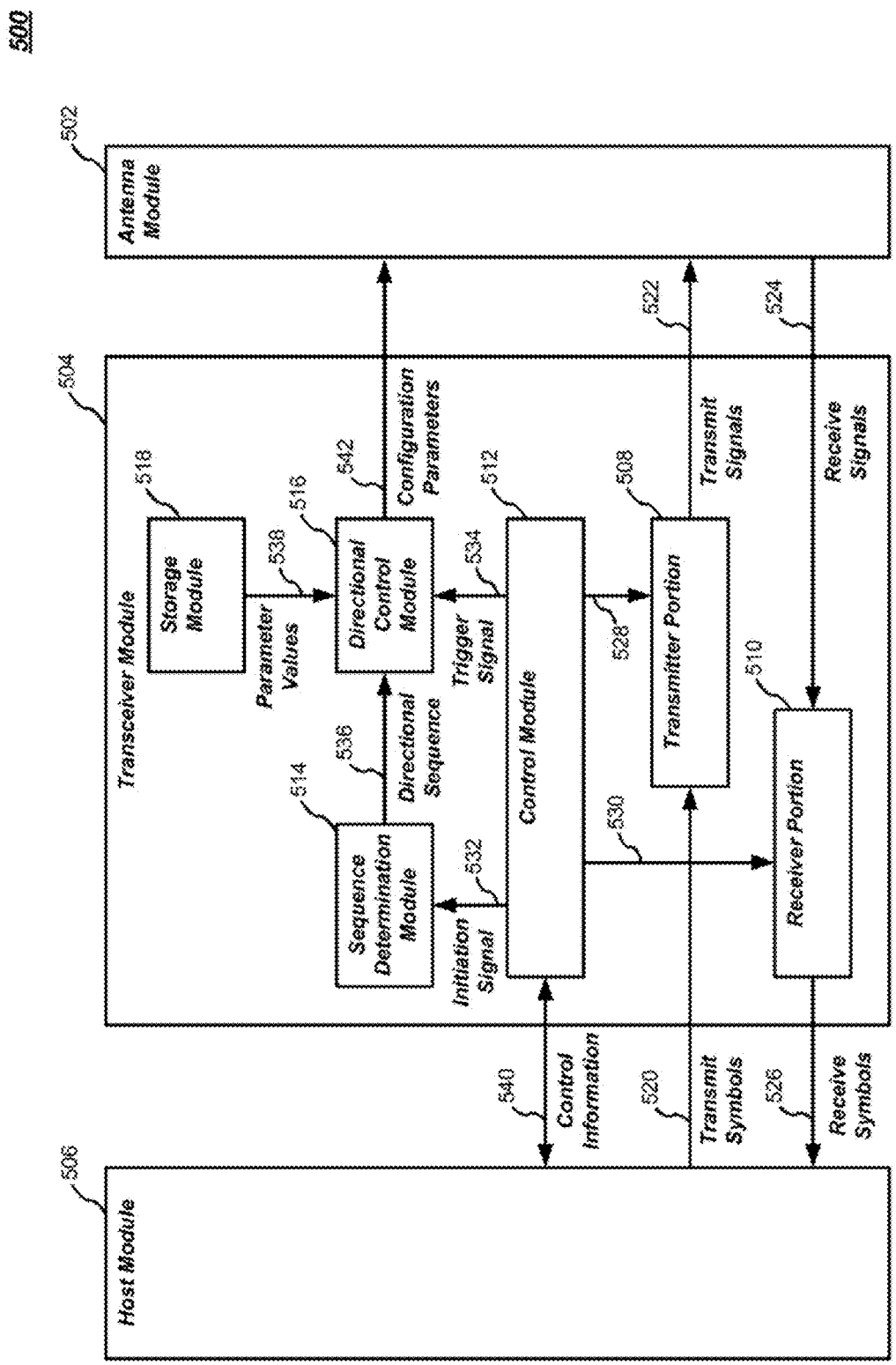
FIG. 5 is a diagram of an exemplary network controller implementation.

FIG. 5 is a diagram of an implementation 500 that may be included in a network controller. As shown in FIG. 5, implementation 500 may include an antenna module 502, a transceiver module 504, and a host module 506. These elements may be implemented in hardware, software, or any combination thereof.

Antenna module 502 provides for the exchange of wireless signals with remote devices. Moreover, antenna module 502 may transmit wireless signals through one or more directional radiation patterns. Thus, antenna module 502 may include multiple antennas and/or multiple radiating elements e.g., phased-array radiating elements). Details regarding exemplary implementations of antenna module 502 are described below with reference to FIG. 6.

Transceiver module 504 provides an interface between antenna module 502 and host module 506. For instance, transceiver module 504 receives symbols 520 from host module 506 and generates corresponding signals 522 for wireless transmission by antenna module 502. This may involve operations, such as modulation, amplification, and/or filtering. However, other operations may be employed. Conversely, receiver portion 510 obtains signals 524 received by antenna module 502 and generates corresponding symbols 526. In turn, receiver portion 510 provides symbols 526 to host module 506. This generation of symbols 526 may involve operations, including (but not limited to) demodulation, amplification, and/or filtering.

The symbols exchanged between host module 506 and transceiver module 504 may form messages or information associated with one or more protocols, and/or one or more user applications. Thus, host module 506 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

In addition, host module 506 may exchange control information 540 with transceiver module 504. This control information may pertain to the operation and status of transceiver module 504. For instance, control information 540 may include directives that host module 506 sends to transceiver module 504. Such directives may establish operating parameters/characteristics for transceiver module 504. Also control information 540 may include data (e.g., operational status information) that host module 506 receives from transceiver module 504.

FIG. 5 shows that transceiver module 504 includes a transmitter portion 508, a receiver portion 510, a control module 512, a sequence selection module 514, a directional control module 516, and a storage module 518. These elements may be implemented in hardware, software, or any combination thereof.

Transmitter portion 508 generates signals 522 from symbols 520. Conversely, receiver portion 510 generates symbols 526 from received signals 524. To provide such features, transmitter portion 508 and receiver portion 510 may each include various components, such as modulators, demodulators, amplifiers, filters, buffers, upconverters, and/or downconveters. Such components may be implemented in hardware (e.g., electronics), software, or any combination thereof.

Signals 522 and 524 may be in various formats. For instance, these signals may be formatted for transmission in IEEE 802.11 IEEE 802.15, and/or IEEE 802.16 networks. However, embodiments are not limited to these exemplary networks be employed.

Control module 512 governs various operations of transceiver module 504. For instance, control module 512 may establish operational characteristics of transmitter portion 508 and receiver portion 510. Such characteristics may include (but are not limited to timing, amplification, modulation/demodulation properties, and so forth. As shown in FIG. 5 the establishment of such characteristics may be implemented in directives 528 and 530, which are sent to transmitter portion 508 and receiver portion 510, respectively.

In addition, control module 512 governs the employment of directional transmission features. In particular, FIG. 5 shows control module 512 generating an initiation signal 532 and a trigger signal 534. These signals control actions of sequence selection module 514 and directional control module 516.

More particularly, upon activation of initiation signal 532, sequence selection module 514 generates a directional sequence 536 that indicates a sequence of directional transmission patterns to be employed by antenna module 502. Sequence selection module 514 may generate this sequence in accordance with various techniques (e.g., random, round robin, and so forth).

In embodiments, control module 512 may activate initiation signal 532 each time a new sequence of directional transmission patterns is to be employed. For example, as described herein, control module 512 may activate initiation signal 532 at each superframe. However, other schemes for activating initiation signal 532 may be employed.

As shown in FIG. 5, directional sequence 536 is sent to directional control module 516. In turn, directional control module 516 establishes operational characteristics for antenna module 502 that correspond to directional sequence 536. As shown in FIG. 5, this may involve configuring antenna module 502 with configuration parameters 542.

Configuration parameters 542 may specify particular parameters to be applied to each antenna and/or radiating element within antenna module 502. Examples of such parameters include (but are not limited to) amplification gains, attenuations factors, and/or phase shifts values. In embodiments, configuration parameters 542 include multiple parameter sets. Each of these sets includes one or more parameters for a directional transmission pattern specified in directional sequence 536.

Directional control module 516 configures antenna module 502 in response to trigger signal 534 (which is received from control module 512). This may involve trigger signal 534 controlling the delivery of parameter sets so antenna module 502 may employ them in synchronization with corresponding directional transmissions within a broadcast.

In embodiments, directional control module 516 may obtain configuration parameters 542 from storage module 518. This feature is shown in FIG. 5 as parameter values 538. Thus, storage module 518 may store information pertaining to a plurality of directional transmission patterns. For example, storage module 518 stores sets of operational parameters that are indexed in accordance with the indexing scheme employed by directional sequence 536. Examples of such storage media are provided below.

Figure 6:
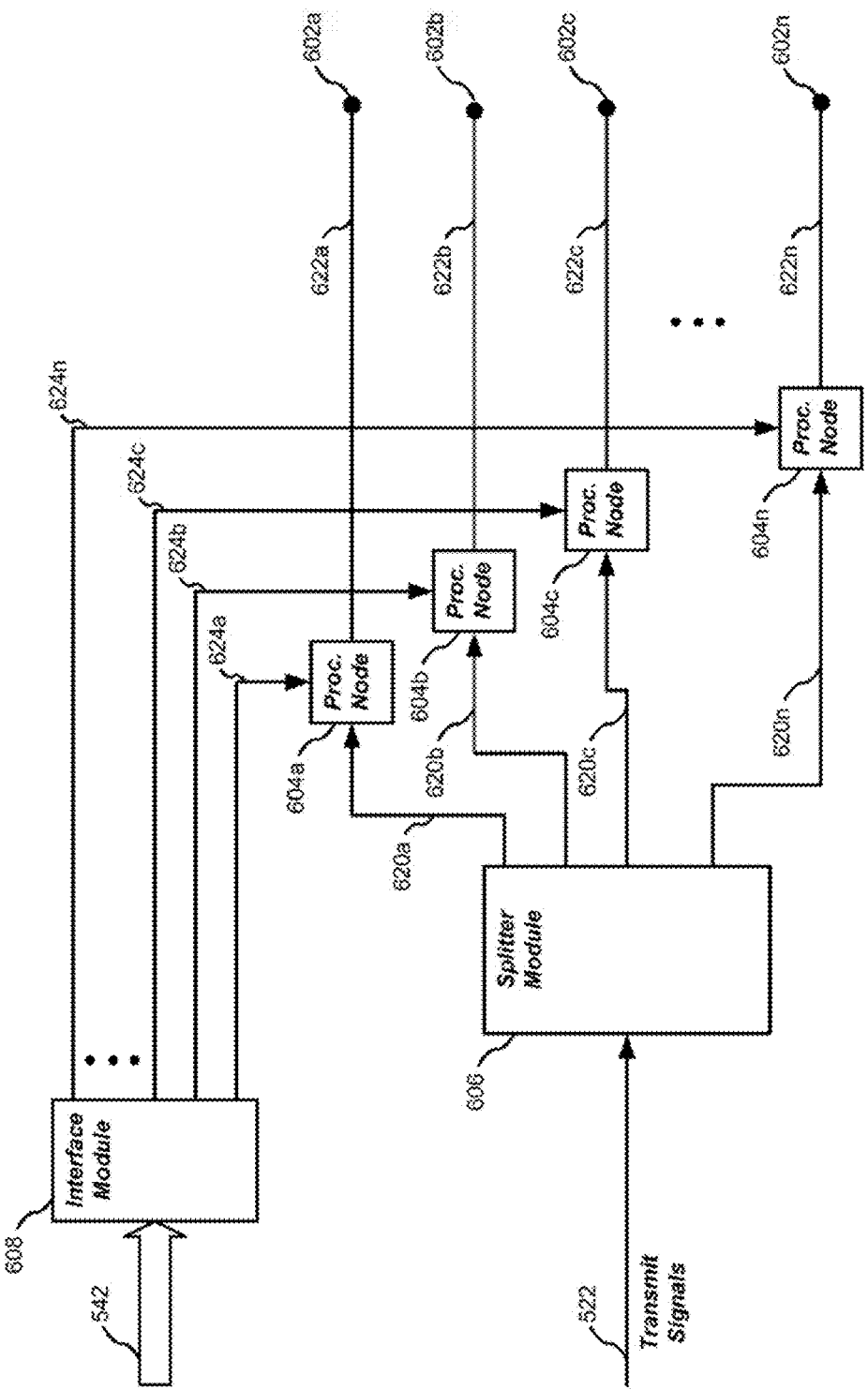
FIG. 6 is a diagram of an exemplary antenna module implementation.

FIG. 6 is a diagram showing an exemplary implementation of antenna module 502. As shown in FIG. 6, this implementation includes multiple radiating elements 602a-n, multiple processing nodes 604a-n, a splitter module 606, and an interface module 608. These elements may be implemented in hardware, software, or any combination thereof.

Each radiating element 602 may be a distinct antenna. Alternatively or additionally, each radiating element 602 may be a radiating element within a phased-array or switched-beam antenna. Thus, together, radiating elements 602a-n may form one or more distinct antennas, and/or one or more phased arrays, and/or one or more switched beam antennas. As shown in FIG. 6, radiating elements 602a-n are each coupled to a corresponding one of processing nodes 604a-n.

As shown in FIG. 6, splitter module 606 receives signal 522 (which is generated by transceiver module 504 of FIG. 5). Upon receipt, splitter module 606 "splits" signal 522 into substantially identical input signals 620a-n. This splitting may occur with some degree of insertion loss. Input signals 620a-n are sent to processing nodes 604a-n, respectively.

Processing nodes 604a-n generate processed signals 622a-n from input signals 620a-n, respectively. In turn, processed signals 622a-n are sent to radiating elements 602a-n, respectively. In generating processed signals 622a-n, processing nodes 604a-n may perform various operations cm input signals 620a-n.

Examples of such operations performed by processing nodes 604a-n include (but are not limited to) attenuation, amplification, and/or phase shifting. Switching is a further exemplary operation. For example, one or more of processing nodes 604a-n may selectively pass or block their corresponding input signal(s) 620. Thus, when an input signal 620 is blocked, its corresponding output signal 622 may be a zero energy (nulled) signal.

The manner in which processing nodes 604a-n generate processed signals 622a-n is determined by control signals 624a-n, respectively. Thus, these signals may convey attenuation factors, amplification gains, phase shift values, switching directives, and so forth.

In embodiments, control signals 624a-n are included in configuration parameters 542, which are received by interface module 608. These parameters may be received in various formats (e.g., analog, digital, serial, parallel, etc.). Interface module 608 extracts these parameters and formats them as control signals 624a-n. As described above, control signals 624a-n are sent to processing nodes 604a-n, respectively.

The implementation of FIG. 6 is shown for purposes of illustration and not limitation. Accordingly, implementations of antenna module 602 may include other elements. For example, implementations may one or more amplifiers and/or filters. Such amplifier(s) and/or filters may be coupled between processing nodes 604a-n and radiating elements 602a-n.

A broadcast scenario is now described with reference to FIGS. 5 and 6. In this scenario, each of radiating elements 602a-n is an antenna having, a particular radiation pattern. For example, the patterns of radiating elements 602a-n may respectively correspond to multiple transmission sectors, such as sectors $S_0$-$S_7$ of FIG. 1.

Accordingly, in this scenario, processing nodes 604a-n operate as switching nodes that may pass or block input signals 620a-n, respectively. As described above, processing nodes 604a-n are controlled by control signals 624a-n, respectively. In this case, these control signals convey binary switching commands (e.g., having states switch open or switch close).

Since each of radiating elements 602a-n corresponds to a particular radiation pattern, control signals 624a-n may sequentially select one of processing nodes 604a-n to be open, and the remaining processing nodes to be closed. Thus, through this selection technique, only of radiating elements 602a-n emits a signal at a time.

Figure 7:
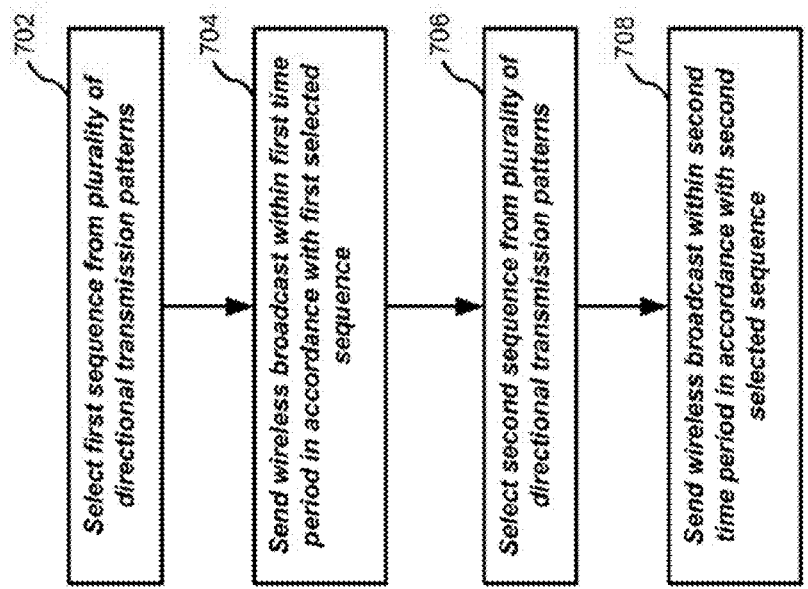
FIG. 7 is a diagram of an exemplary logic flow.

FIG. 7 illustrates an embodiment of a logic flow. In particular, FIG. 7 illustrates a logic flow 700, which may be representative of the operations executed by one or more embodiments described herein. Although FIG. 7 shows a particular sequence, other sequences may be employed. Also, the depicted operations may be performed in various parallel and/or sequential combinations.

The flow of FIG. 7 involves the transmission of a wireless broadcast. This broadcast may convey various forms of information. For instance, in embodiments, the wireless broadcast may be beacons and/or data frames. However, embodiments are not limited to these examples.

At a block 702, a first sequence of a plurality of directional transmission patterns is selected. In the context of FIG. 5, this may be performed by sequence selection module 514. Each of the plurality of directional transmission patterns ma correspond to a sector within an available transmission panorama. For instance, the directional transmission patterns may correspond to sectors $S_0$-$S_7$ of FIG. 1.

At a block 704, the wireless broadcast is sent within a first time period. More particularly, the wireless broadcast is sent within the first time period in accordance with the sequence selected at block 702. This first time period may be a first superframe within a TDMA transmission format.

As shown in FIG. 7, a second sequence of the plurality of directional transmission patterns is selected at a block 706. Referring again to FIG. 5, this block may be performed by sequence selection module 514.

At a block 708, the wireless broadcast is sent within a second time period. In particular, the broadcast is sent during the second time period in accordance with the second sequence of directional transmission patterns. This second time period may be a second superframe within a TDMA transmission format. For example, the first and second superframes may be consecutive superframes.

In the above description, blocks 702 and 706 involve sequences of directional transmission patterns being selected. These selections may be made in accordance with various techniques, such as random and/or round robin. Embodiments, however, are not limited to these techniques.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, firmware, software modules, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine ma include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the directional transmission techniques described herein are not limited to networks employing TDMA. Networks employing, other transmission formats, such as CSMA/CA, and carrier sense multiple access with collision detection (CSMA/CD), may also employ such directional transmission techniques.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
   a sequence selection module to select first and second sequences of a plurality of directional transmission patterns, each of the plurality of directional transmission patterns corresponding to a sector; and
   a plurality of radiating elements to:
   wirelessly transmit, in a first time interval, multiple beacon transmissions in accordance with the first sequence; and
   wirelessly transmit, in a second time interval, multiple beacon transmissions in accordance with the second sequence.

2. The apparatus of claim 1, wherein the sequence selection module is to randomly select between the first and second sequences.

3. The apparatus of claim 1, further comprising: a directional control module to establish operational characteristics for the plurality of radiating elements based on the first and second sequences.

4. The apparatus of claim 1, further comprising: a host module to perform operations associated with one or more user applications.

5. The apparatus of claim 1, wherein each of the first and second sequences encompasses a full rotation panorama.

6. The apparatus of claim 1, wherein the plurality of radiating elements is to wirelessly transmit a data transmission between the first and second time intervals.

7. The apparatus of claim 1, wherein the first time interval and second time interval are beacon periods.

8. The apparatus of claim 1, wherein the first sequence is different from the second sequence.

9. A method, comprising:
   selecting a first sequence of a plurality of directional transmission patterns;
   sending, in a first time period, multiple beacon transmissions in accordance with the first sequence of the plurality of directional transmission patterns;
   selecting a second sequence of the plurality of directional transmission patterns; and
   sending, in a second time period, multiple beacon transmissions in accordance with the second sequence of the plurality of directional transmission patterns,
   wherein the first sequence is different from the second sequence.

10. The method of claim 9: wherein said selecting the first sequence and said selecting the second sequence are in accordance with a random selection technique.

11. The method of claim 9, wherein each of the plurality of directional transmission patterns corresponds to a sector in an available transmission panorama.

12. The method of claim 9, wherein the first time period and second time period are beacon periods.

13. The method of claim 9, further comprising wirelessly transmitting a data transmission between the first and second time periods.

14. An apparatus, comprising:
   a sequence selection module to select first and second sequences of a plurality of directional transmission patterns, each of the plurality of directional transmission patterns corresponding to a sector; and
   a directional control module to establish operational characteristics for a plurality of radiating elements based on the first and second sequences,
   wherein the operational characteristics are in accordance the first sequence for multiple beacon transmissions in a first time interval;
   wherein the operational characteristics are in accordance the second sequence for multiple beacon transmissions in a second time interval.

15. The apparatus of claim 14, wherein the sequence selection module is to randomly select between the first and second sequences.

16. The apparatus of claim 14, further comprising: a host module to perform operations associated with one or more user applications.

17. The apparatus of claim 14, wherein one or more user applications include a video application.

18. The apparatus of claim 14, wherein each of the first and second sequences encompasses a full rotation panorama.

19. The apparatus of claim 14, wherein the plurality of radiating elements is to wirelessly transmit a data transmission between the first and second time intervals.

20. The apparatus of claim 14, wherein the first time interval and the second time interval are beacon periods.

21. The apparatus of claim 14, wherein the first sequence is different from the first sequence.

22. The apparatus of claim 14, further comprising the plurality of radiating elements.

23. An article comprising a non-transitory machine-accessible medium having stored thereon instructions that, when executed by a machine, cause the machine to:

select first and second sequences of a plurality of directional transmission patterns, each of the plurality of directional transmission patterns corresponding to a sector; and establish operational characteristics for a plurality of radiating elements based on the first and second sequences, wherein the operational characteristics are in accordance the first sequence for multiple beacon transmissions in a first time interval; and wherein the operational characteristics are in accordance the second sequence for multiple beacon transmissions in a second time interval.

24. The article of claim 23, wherein said selecting the first sequence and said selecting the second sequence are in accordance with a random selection technique.

25. The article of claim 23, wherein each of the first and second sequences encompasses a full rotation panorama.

* * * * *